United States Patent [19]
Bechade

[11] Patent Number: 6,003,059
[45] Date of Patent: *Dec. 14, 1999

[54] CARRY SELECT ADDER USING TWO LEVEL SELECTORS

[75] Inventor: Roland A. Bechade, Somerville, N.J.

[73] Assignee: International Business Machines Corp., Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/804,703

[22] Filed: Feb. 21, 1997

[51] Int. Cl.$^6$ ........................................ G06F 7/50
[52] U.S. Cl. ............................ 708/714; 708/702
[58] Field of Search ............................ 364/788; 708/714

[56] References Cited

U.S. PATENT DOCUMENTS

| | | | |
|---|---|---|---|
| 3,553,446 | 1/1971 | Kruy | ........................................ 364/788 |
| 4,525,797 | 7/1985 | Holden . | |
| 4,566,064 | 1/1986 | Whitaker . | |
| 4,573,137 | 2/1986 | Ohhashi . | |
| 4,901,269 | 2/1990 | Stoelzle . | |
| 4,982,357 | 1/1991 | Bechade . | |
| 5,027,311 | 6/1991 | Zion . | |
| 5,027,312 | 6/1991 | Knauer et al. . | |
| 5,047,976 | 9/1991 | Goto et al. . | |
| 5,235,539 | 8/1993 | Patel . | |
| 5,289,420 | 2/1994 | Neu . | |
| 5,396,445 | 3/1995 | Lal . | |
| 5,471,414 | 11/1995 | Kumar et al. . | |
| 5,483,478 | 1/1996 | Chiang . | |
| 5,487,025 | 1/1996 | Partovi et al. . | |

*Primary Examiner*—Tan V. Mai
*Attorney, Agent, or Firm*—Whitham, Curtis & Whitham; Eugene I. Shkurko

[57] ABSTRACT

A carry select adder including a two level carry selector connected to multiple carry chains. Two or more adders produce at least two pairs of candidate carry-out signals in parallel. For each pair, a first candidate carry-out signal is based on a first presumed carry-in signal and a second candidate carry-out signal is based on a second presumed carry-in signal different than the first presumed carry-in signal. A two-level selector for simultaneously selects, for each of the pairs of candidate carry-out signals, either the first candidate carry-out signal or the second candidate carry-out signal as an actual carry-out signal, based on an actual carry-in signal. Both selected carry out signals are passed to.

15 Claims, 8 Drawing Sheets

N TRANSISTOR

P TRANSISTOR

| $co_{0-3}/c1_{0-3}$ \ $co_{4-7}/c1_{4-7}$ | 00 | 01 | 11 | 10 |
|---|---|---|---|---|
| 00 | 0 | 0 | 1 | ∅ |
| 01 | 0 | 0 | 1 | ∅ |
| 11 | 0 | 1 | 1 | ∅ |
| 10 | ∅ | ∅ | ∅ | ∅ |

| $co_{0-3}/c1_{0-3}$ \ $co_{4-7}/c1_{4-7}$ | 00 | 01 | 11 | 10 |
|---|---|---|---|---|
| 00 | 0 | 0 | 1 | ∅ |
| 01 | 0 | 1 | 1 | ∅ |
| 11 | 0 | 1 | 1 | ∅ |
| 10 | ∅ | ∅ | ∅ | ∅ |

CARRY SELECT ADDER USING TWO LEVEL SELECTORS

BACKGROUND OF THE INVENTION

1. Field of the Invention

The present invention generally relates to carry adders and more particularly to carry select adders which generate two pairs of candidate carry-out signals and include selectors for choosing one candidate carry-out signal from each of the two pairs, depending upon a carry-in signal.

2. Description of the Related Art

Adders are used to perform mathematical functions, increment counters and perform address calculations. Many recent designs use dynamic logic to speed up the adders. Dynamic logic introduces an entirely new set of requirement to the design of adders, such as the need for pre-charge time and the gating of inputs to the dynamic logic circuits. Further, there are problems associated with the increasing power noise and the power dissipation associated with dynamic logic circuits.

There are many different approaches to the design of adders. Dynamic adders are the fastest but introduce many undesirable design considerations. In static adders many trade-offs are made between circuit complexity and the total number of logic stages in the critical path.

Two common adders are the carry look ahead adder and the carry select adder. The carry select adder trades circuit redundancy and the speed of the selectors for a larger number of delay stages. A carry look ahead adder generally has a more complex logic structure and a larger fanout but has fewer delay stages. The shortest static adder delay occurs with the carry look ahead design, but some carry select adders, with simpler and denser designs, have performance levels close to the carry look ahead adder.

The carry-select adder operates as follows. Two additions are performed in parallel. One presumes that the carry-in will be "0" and the other presumes that the carry-in will be "1". When the actual carry-in becomes known, the carry select adder selects the result of the addition operation which corresponds to the actual carry-in. By precalculating alternative addition results, the speed of the adder is increased. A typical carry select adder is shown in U.S. Pat. No. 5,487,025 to Partovi et al., and U.S. Pat. No. 4,982,357 to Bechade, which are incorporated herein by reference.

A conventional 16-bit carry select adder is shown in FIG. 8. The carry select adder shown in FIG. 8 is used to add a 16-bit value A to another 16-bit value B. A 4-bit adder 810 receives the least significant four bits $A_{0-3}$, $B_{0-3}$ of the two 16-bits to be summed. Adder 810 adds the four bits and produces a sum output $S\,0_{0-3}$ and a carry-out $C0_{0-3}$ based on a presumed carry-in of "0" $C_0$.

Simultaneously, a 4-bit adder 811 performs the same operation as adder 810 except that adder 811 operates based on a presumed carry-in of "1" $C_1$ and outputs a sum output $S1_{0-3}$ and a carry-out $C1_{0-3}$.

Both adders 810, 811 output to a value selector 812 and a carry selector 813. The value selector 812 chooses between the two sum outputs $S0_{0-3}$, $S1_{0-3}$, based on an actual carry-in $C_{in}$, and outputs a sum output $S_{0-3}$. Similarly, the carry selector 813 chooses between the two carry-outs $C0_{0-3}$, $C1_{0-3}$ based on an actual carry-in $C_{in}$ and outputs a carry-out $C_{0-3}$. Therefore, the carry selector will choose $C0_{0-3}$ as the actual carry-out. The two parallel 4-bit adders 810, 811 and the selectors 812, 813 are sometimes called a carry chain.

The next most significant four bits, $A_{4-7}$, $B_{4-7}$ are similarly summed in parallel (i.e., simultaneously) by two 4-bit adders 820 and 821. Adder 820 receives a presumed carry-in of "0" $C_0$ and outputs a first potential sum $S0_{4-7}$ and carry-out $C0_{4-7}$ based on the carry-in being "0". Adder 821 receives a presumed carry-in of "1" $C_1$ and outputs a first potential sum $S1_{4-7}$ and carry-out $C1_{4-7}$ based on the carry-in being "1".

A value selector 822 receives the actual carry-out $C_{0-3}$ from the carry selector 813 as a true (or actual) carry-in and selects between the outputs $S0_{4-7}$ and $S1_{4-7}$ based on whether the carry-out from carry selector 113 is "1" or "0". The value selector 822 outputs a true sum output $S_{4-7}$. Similarly, a carry selector 823 receives the true carry-out $C_{0-3}$ from carry selector 813 as a true carry-in and selects between carry-out $C_{4-7}$ and carry-out $C1_{4-7}$ based on whether the true carry-out from carry selector 813 is "1" or "0". Carry selector 823 outputs a true carry-out $C_{4-7}$.

Similarly, the next carry chains add the higher order bits. Adders 830, 831 and 840, 841 sum the next most significant bits $A_{8-11}$, $B_{8-11}$ and $A_{12-15}$, $B_{12-15}$ in parallel and output first potential sums $S0_{8-11}$, $S1_{8-11}$, $S0_{12-15}$ and $S1_{12-15}$ based on a presumed carry-in of "0" and "1", respectively. Value selectors 832 and 842 select the true sum outputs $S_{8-11}$, $S_{12-15}$ from the potential sum outputs $S0_{8-11}$, $S1_{8-11}$, $S0_{12-15}$ and $S1_{12-15}$ based on whether the actual carry-out $C_{4-7}$, $C_{8-11}$ from the previous carry selectors 823, 833 are "0" or "1". Carry selectors 833, 843 similarly select from the respective carry-outs $C0_{8-11}$, $C1_{8-11}$, $C0_{12-15}$ and $C1_{12-15}$ also based on whether the actual carry-out $C_{4-7}$, $C_{8-11}$ from the previous carry selectors 823, 833 are "0" or "1".

Carry select adders are able to decrease the time required to sum values because each carry chain operates in parallel (i.e., simultaneously). Once the carry chain for the least significant bits (i.e., 0–3) completes a sum operation and outputs a true carry-out $C_{0-3}$, the value selectors 822, 832 and 842 and carry selectors 823, 833 and 843 merely select between the candidate outputs which have been previously calculated by the adder units based on the actual carry-out of the previous carry selector.

However, conventional carry select adders require a large amount of carry selectors (i.e., one carry selector per carry chain) which increases the delay of the carry select adder because an additional delay is associated with each carry selector.

SUMMARY OF THE INVENTION

It is, therefore, an object of the present invention to provide a carry select adder that operates faster than conventional carry select adders by using a two-level carry selector connected to multiple carry chains. The two-level carry selector reduces the delay associated with the carry selectors and allows the inventive adder to operate at a much higher speed than the conventional carry select adder.

More specifically, the invention includes adders for producing at least two pairs of candidate carry-out signals in parallel, wherein a first candidate carry-out signal is based on a first presumed carry-in signal and a second candidate carry-out signal is based on a second presumed carry-in signal different than the first presumed carry-in signal, a two-level selector for simultaneously selecting, for each of the pairs of candidate carry-out signals, either the first candidate carry-out signal or the second candidate carry-out signal as an actual carry-out signal, based on an actual carry-in signal.

The two-level selector uses a pass transistor logic circuit to allow a single selector to perform the function of two selectors, thereby allowing the circuit to include less delay elements and making the circuit operate faster.

BRIEF DESCRIPTION OF THE DRAWINGS

The foregoing and other objects, aspects and advantages will be better understood from the following detailed description of a preferred embodiment of the invention with reference to the drawings, in which:

FIG. 7A is a Karnaugh map showing the output of the circuit of FIG. 3 given various inputs;

FIG. 7B is a Karnaugh map showing the output of the circuit of FIG. 3 given various inputs;

DETAILED DESCRIPTION OF A PREFERRED EMBODIMENT OF THE INVENTION

Figure 1:
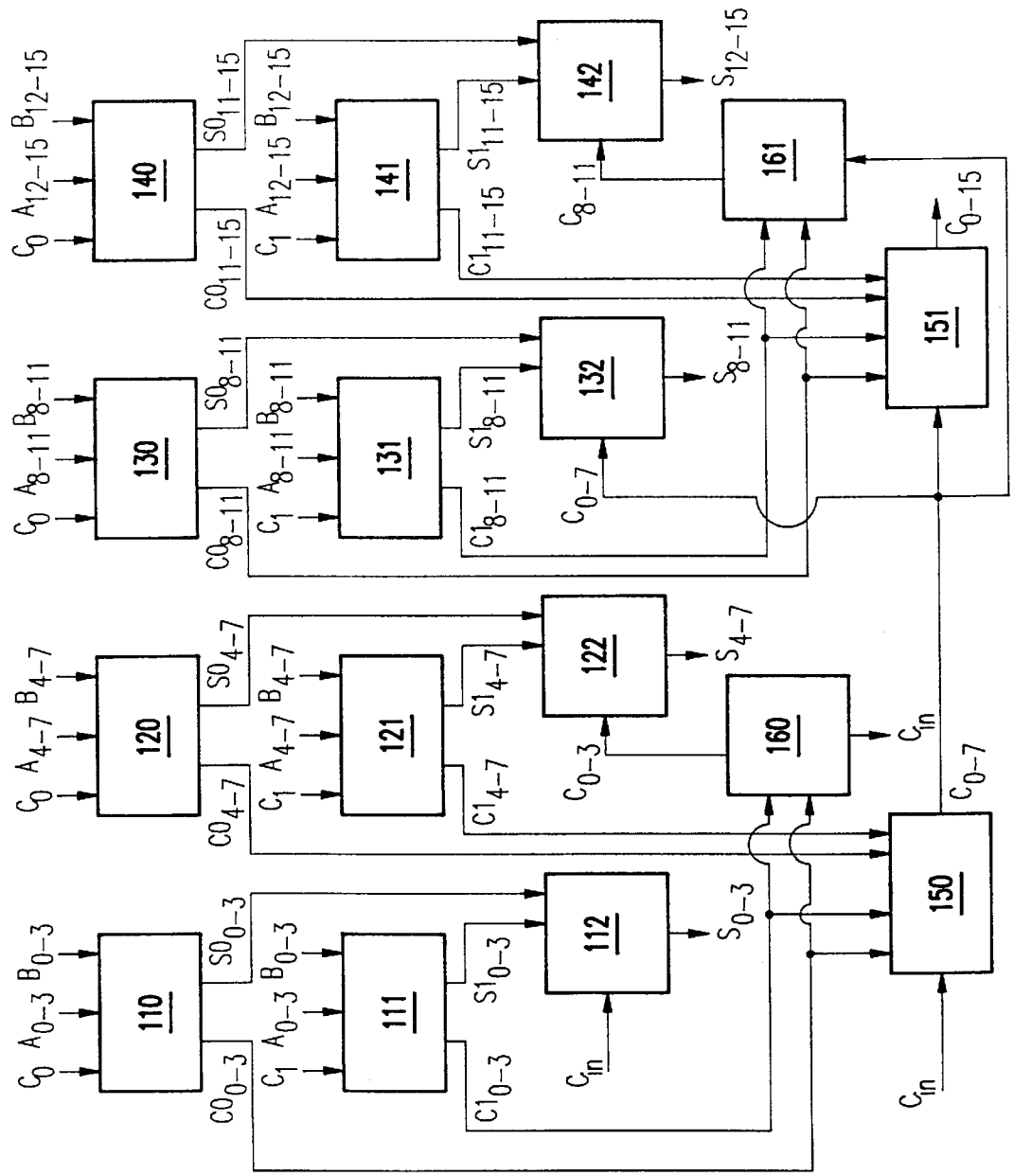
FIG. 1 is a schematic circuit diagram of a carry select adder of the present invention.

Referring now to the drawings, and more particularly to FIG. 1, a carry select adder according to the present invention is illustrated.

The carry select adder shown in FIG. 1 is a 16-bit adder that adds a 16-bit value A to another 16-bit value B. A 4-bit adder (also referred to sometimes as a carry generator) 110 receives the least significant four bits $A_{0-3}$, $B_{0-3}$ of each of the two 16-bits to be summed. Adder 110 adds the four bits and produces a sum output $S0_{0-3}$ and a carry-out $C0_{0-3}$ based on a presumed carry-in of "0" $C_0$. The operation of the 4 bit adder is explained in greater detail below with reference to FIG. 4.

Simultaneously, a second 4-bit adder 111 performs the same operation as adder 110 except that adder 111 operates based on a presumed carry-in of "1" $C_1$ and outputs a sum output $S1_{0-3}$ and a carry-out $C1_{0-3}$.

Both adders 110, 111 output to a value selector 112 and a carry selector 150. The value selector 112 chooses between the two sum outputs $S0_{0-3}$, $S1_{0-3}$ based on an actual carry-in $C_{in}$ and outputs a sum output $S_{0-3}$. The internal operation of such a selector is well known to those ordinarily skilled in the art and will not be discussed in detail herein, for the sake of brevity. The internal operation of selectors 122, 132, 142, 160 and 161 is similar to selector 112 and will also not be discussed in detail.

The next most significant four bits, $A_{4-7}$ and $B_{4-7}$ are similarly summed in parallel (i.e., simultaneously) by two 4-bit adders 120 and 121. Adder 120 receives a presumed carry-in of "0" $C_{in}$ and outputs a first potential sum $S0_{4-7}$ and carry-out $C0_{4-7}$ based on the presumed carry-in being "0". Adder 121 receives a presumed carry-in of "1" $C_1$ and outputs a first potential sum $S1_{4-7}$ and carry-out $C1_{4-7}$ based on the presumed carry-in being "1".

A carry-out selector circuit 160 selects between the carry-out produced during the adder operation which operated with a presumed carry-in of "0" (i.e., $C0_{0-3}$) and the carry-out associated with the adder operation which operated with a presumed carry-in of "1" (i.e., $C1_{0-3}$), based on the actual carry-in $C_{in}$, and outputs an actual (true) carry-in to a value selector 122.

The value selector 122 receives the true carry-in from the carry-out selector circuit 160 and selects between the outputs $S0_{4-7}$ and $S1_{4-7}$ based on whether the true carry-in is "1" or "0". The value selector 122 outputs a true sum output $S_{4-7}$.

Two-level carry selector 150 chooses between the presumed carry-out signals $C0_{0-3}$, $C1_{0-3}$, $C0_{4-7}$ and $C1_{4-7}$ received, respectively, from the adders 110, 111, 120 and 121 based on an actual carry-in signal $C_{in}$. The operation of the two-level carry selector is explained in more detail below with reference to FIG. 3.

The next carry chains similarly add the higher order bits. Adders 130, 131 and 140, 141 sum the next most significant bits $A_{8-11}$, $B_{8-11}$ and $A_{12-15}$, $B_{12-15}$ in parallel and output first potential sums $S0_{8-11}$, $S1_{8-11}$, $S0_{12-15}$ and $S1_{12-15}$ based on presumed carry-in signals of "0" and "1", respectively. Value selectors 132 and 142 select the true sum outputs $S_{8-11}$, $S_{12-15}$ from the potential sum outputs $S0_{8-11}$, $S1_{8-11}$, $S0_{12-15}$ and $S1_{12-15}$ based on the actual carry-in selected by the carry-out selector circuit 161. The carry-out selector circuit 161 receives a carry-out $C_{0-7}$ from the two-level carry selector 150 as the actual carry-in.

Two-level carry selector 151 similarly receives the candidate carry-out signals $C0_{8-11}$, $C1_{8-11}$, $C0_{12-15}$ and $C1_{12-15}$ from adders 130, 131, 140 and 141 and outputs a carry-out signal $C_{0-15}$ based on whether the carry-out signal $C_{0-7}$ from two-level carry selector 150 is a "1" or a "0". As explained above, if the carry-out $C_{0-7}$ is a "0", the candidate carry-out signals associated with a carry-in of "0" (i.e., carry-out signals $C0_{8-11}$ and $C0_{12-15}$) are selected. If the carry-out $C_{0-7}$ is "1", the candidate carry-out signals associated with a carry-in of "1", carry signals $C1_{8-11}$ and $C1_{12-15}$, are selected.

Figure 2:
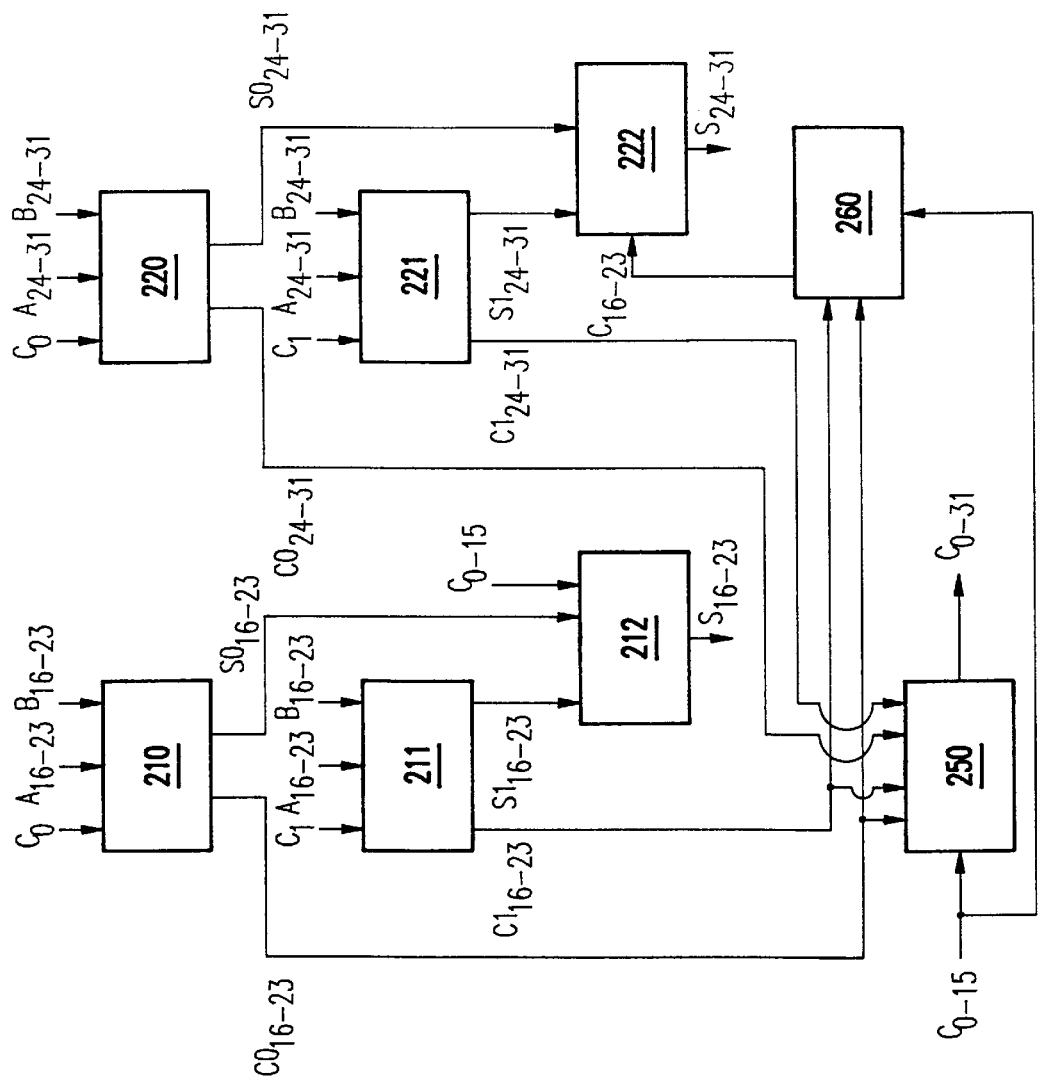
FIG. 2 is a schematic circuit diagram of carry select adder for higher order bits of the present invention.

FIG. 2 illustrates a carry select adder which adds the higher order bits (i.e., bits 16–31) and is substantially similar to the carry select adder illustrated in FIG. 1 except that 8-bit adders are utilized instead of 4-bit adders. By using 8-bit adders instead of 4-bit adders, the length of each the delays is increased but, more importantly, the number of delays is decreased.

More specifically, an 8-bit adder 210 receives the least significant eight bits $A_{16-23}$, $B_{16-23}$ of each of the two upper order 16-bits to be summed. Adder 210 adds the eight bits and produces a sum output $S0_{16-23}$ and a carry-out $C0_{16-23}$ based on a presumed carry-in of "0" $C_0$. The operation of the 8-bit adder is substantially similar to the 4-bit adder discussed above.

Simultaneously, a second 8-bit adder 211 performs the same operation as adder 210 except that adder 211 operates based on a presumed carry-in of "1" $C_1$ and outputs a sum output $S1_{16-23}$ and a carry-out $C1_{16-23}$.

Both adders 210, 211 output to a value selector 212 and a two-level carry selector 250. The value selector 212 chooses between the two sum outputs $S0_{16-23}$, $S1_{16-23}$ based on the carry-out $C_{0-15}$ from the lower order adder illustrated in FIG. 1 and outputs a sum output $S_{16-23}$. The internal operation of selectors 212 and 222 is similar to selector 112, discussed above, and will also not be discussed in detail.

The next most significant eight bits, $A_{24-31}$ and $B_{24-31}$ are similarly summed in parallel (i.e., simultaneously) by two 8-bit adders 220 and 221. Adder 220 receives a presumed carry-in of "0" C. and outputs a first potential sum $S0_{24-31}$ and carry-out $C0_{24-31}$. Adder 221 receives a presumed carry-in of "1" $C_1$ and outputs a first potential sum $S1_{24-31}$ and carry-out $C1_{24-31}$.

A carry-out selector circuit 260 selects between the carry-out produced during the adder operation which operated with a presumed carry-in of "0" (i.e., $C0_{16-23}$) and the carry-out associated with the adder operation which operated with a presumed carry-in of "1" (i.e., $C1_{16-23}$), based on the carry-out $C_{0-15}$ from the lower order adder illustrated in FIG. 1, and outputs an actual (true) carry-in $C_{16-23}$ to a value selector 222.

The value selector 222 receives the true carry-in $C_{16-23}$ from the carry-out selector circuit 260 and selects between the outputs $S0_{24-31}$ and $S1_{24-31}$ based on whether the true carry-in is "1" or "0". The value selector 222 outputs a true sum output $S_{24-31}$.

Two-level carry selector 250 chooses between the presumed carry-out signals $C0_{16-23}$, $C1_{16-23}$, $C0_{24-31}$ and $C1_{24-31}$ received, respectively, from the adders 210, 211, 220 and 221 based on the carry-out $C_{0-15}$ from the lower order adder illustrated in FIG. 1.

As mentioned above, by using 8-bit adders instead of 4-bit adders, the length of the delays is increased but, more importantly, the number of delays is decreased. The lower order adder illustrated in FIG. 1 operates simultaneously with the upper order adder illustrated in FIG. 2. Notwithstanding the increase in the length of each of the delays, the circuit illustrated in FIG. 2 will complete its operation commensurate with the operation of the lower 16-bit adder shown in FIG. 1 such that the upper 16-bit adder adds only one delay to the entire 32-bit addition. The additional delay is associated with the two level selector 250, discussed in detail below.

In other words, adders 210, 211, 220 and 221 operate in parallel with adders 110, 111, 120, 121, 130, 131, 140 and 141. While adders 210, 211, 220 and 221 incur a fractionally longer time delay, this additional time period is substantially less than the delays associated with the two selectors 150, 151. Therefore, the only additional delay associated with the circuit shown in FIG. 2 is the two level selector 250. By using 8-bit adders, only one two level selector is required, so that the circuit in FIG. 2 only incurs a single additional delay.

Figure 3:
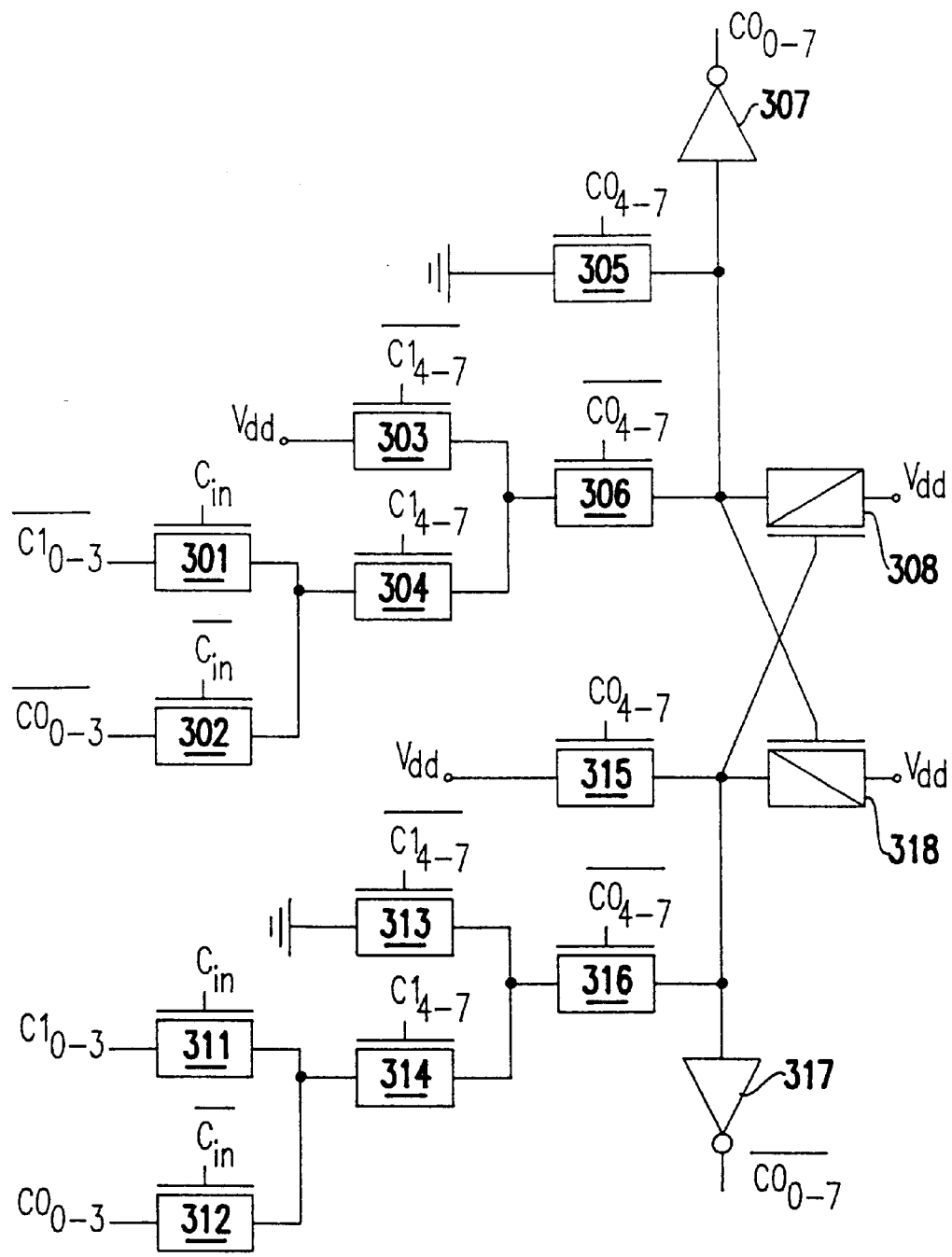
FIG. 3 is a schematic circuit diagram of a two-level selector circuit of the present invention.
Figure 3:
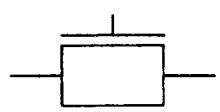
Figure 3:
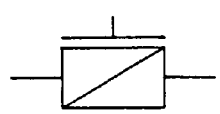

FIG. 3 illustrates a two-level carry selector in greater detail. For purposes of example, the signals which flow within two-level selector 151 have been illustrated in FIG. 3. However, the circuit is equally applicable to all other two-level selectors discussed herein.

The two-level carry selector circuit utilizes complementary pass transistor logic ("CPL") which provides push-pull action with one side pulling down to ground and the other side pulling up to a voltage Vdd.

FIG. 3 illustrates a series of n-type transistors 301–306 and 311–316, cross coupled p-type transistors 308, 318 and inverters 307, 317. These transistors could be any type of common transistors or elements which function similarly, as is known by those ordinarily skilled in the art. The p-type transistors are illustrated as boxes with a diagonal line and the n-type transistors are illustrated as empty boxes. For purposes of this application it will be assumed that n-type transistors allow signals to pass when the gate is supplied with a "1" (i.e., high voltage signal) and p-type transistors allow signals to pass when the gate is supplied with a "0" (i.e., low voltage signal)

In FIG. 3, the complement of a signal is illustrated with a bar above the signal symbol. The complement of a signal is obtained by processing the signal through an inverter or similar device as is known to those ordinarily skilled in the art.

The source of the transistor 301 is supplied with the complement of the carry-out $C1_{0-3}$ of the lower order bit adder 111 which added with a presumed carry-in of "1" and the gate of transistor 301 is supplied with the actual carry-in $C_{in}$. The source of transistor 302 is supplied with the complement of the carry-out $C0_{0-3}$ of the lower order bit adder 110 which added with a presumed carry-in of "0" and the gate is supplied with the complement of the actual carry-in $C_{in}$.

The source of transistor 303 is supplied with a voltage Vdd (i.e., "1") and the gate is supplied with the complement of the carry-out $C1_{4-7}$ of the higher order bit adder 121 which added with a presumed carry-in of "1". The source of transistor 304 is supplied with the output of transistors 301 and 302 and the gate is supplied with the carry-out $C1_{4-7}$ of the higher order bit adder 121 which added with a presumed carry-in of "1".

The source of transistor 305 is supplied with a ground voltage (i.e., "0") and the gate is supplied with the carry-out $C0_{4-7}$ of the higher order bit adder 121 which added with a presumed carry-in of "0". The source of transistor 306 is supplied with the output of transistors 303 and 304 and the gate is supplied with the complement of the carry-out $C0_{4-7}$ of the higher order bit adder 121 which added with a presumed carry-in of "0".

Inverter 307 inverts the outputs of transistors 305 and 306 and is connected to the cross coupled pair of p-type transistors 308, 318 and outputs the true carry-out $C_{0-7}$.

The source of the transistor 311 is supplied with the carry-out $C1_{0-3}$ of the lower order bit adder 111 which added with a presumed carry-in of "1" and the gate of transistor 311 is supplied with the actual carry-in $C_{in}$. The source of transistor 312 is supplied with the carry-out $C0_{0-3}$ of the lower order bit adder 110 which added with a presumed carry-in of "0" and the gate is supplied with the complement of the actual carry-in $C_{in}$.

The source of transistor 313 is supplied with a ground voltage and the gate is supplied with the carry-out $C1_{4-7}$ of the higher order bit adder 121 which added with a presumed carry-in of "1". The source of transistor 314 is supplied with the output of transistors 311 and 312 and the gate is supplied with the complement of the carry-out $C1_{4-7}$ of the higher order bit adder 121 which added with a presumed carry-in of "1".

The source of transistor 315 is supplied with a voltage Vdd and the gate is supplied with the carry-out $C0_{4-7}$ of the higher order bit adder 121 which added with a presumed carry-in of "0". The source of transistor 316 is supplied with the output of transistors 313 and 314 and the gate is supplied with the complement of the carry-out $C0_{4-7}$ of the higher order bit adder 121 which added with a presumed carry-in of "0".

Inverter 317 inverts the outputs of transistors 315 and 316 and is connected to the cross coupled pair of p-type transistors 308, 318 and outputs the complement of the true carry-out $C_{0-7}$.

The two-level selector circuit 150 shown in FIG. 1 receives the true carry-in $C_{in}$ from an external source or previous adder. The two-level selector 151, also shown in FIG. 1, receives the true carry-out $C_{0-7}$ output from the two-level selector 150 as the true carry-in $C_{in}$.

The CPL circuit of FIG. 3 generates true and complementary outputs. The inputs to the circuit are all true and complement inputs with devices 301–306 generating the complement of the function and devices 311–316 generating the true function, which are inverted by the output inverters 307, 317.

The operation of the two-level selector circuit will be explained with reference to the Karnaugh maps (or truth tables) shown in FIGS. 7A and 7B. The map shown in FIG. 7A represents outputs of the two-level selector circuit shown in FIG. 3 given a true carry-in $C_{in}$ of "0" and the map in FIG. 7B represents outputs given a true carry-in $C_{in}$ of "1". The maps show the various possible carry-out signals from the higher order adders (i.e., 120 and 121) and the lower order adders (i.e., 110 and 111) that are connected to the two-level selector circuit and are represented by the carry-out signals shown in the previous figures (i.e., $C0_{0-3}$, $C1_{0-3}$, $C0_{4-7}$ and $C1_{4-7}$).

Beginning with the upper left corner of the map shown in FIG. 7A, the inputs of carry-out signal $C0_{0-3}$ of a lower order adder 110 is "0", the carry-out signal $C1_{0-3}$ of the other lower order adder 111 is "0", the carry-out $C0_{4-7}$ of a higher order adder 120 is "0" and the carry-out $C1_{4-7}$ of the other higher order adder 121 is "0". As mentioned above, the true carry-in $C_{in}$ is "0". The map in FIG. 7A indicates that the two-level selector circuit outputs a carry-out of "0" given these inputs.

Referring to FIG. 3, it can be seen that with the foregoing inputs, the sources of transistors 301 and 302 are supplied with the complement of a "0", which means the sources are supplied with signals of "1". The gate of transistors 301 is supplied with a "0" and the gate of transistor 302 is supplied with the complement of "0" (i.e., "1"). Since the n-type transistors are defined above to pass signals only when the gate is supplied with a "1", only transistor 302 passes the "1" signal to transistor 304.

It can be seen from the above discussion that transistors 301 and 302 act as a pair to allow either the complement of carry-out signal $C1_{0-3}$ or the complement of carry-out signal $C0_{0-3}$ to pass depending upon the true carry-in $C_{in}$.

Transistors 303 and 304 similarly act as a pair to allow either a voltage signal (i.e., a "1") or the output of transistors 301, 302 to pass depending upon the carry-out signal $C1_{4-7}$ of the higher order bit adder 121 which added with a presumed carry-in of "1". In the example represented by the upper left corner of the map shown in FIG. 7A, the gate of transistor 304 is supplied with a "0". Therefore, transistor 304 does not allow the voltage signal to pass. To the contrary, the gate of transistor 303 is supplied with the complement of "0" (i.e., "1") and allows the output of transistors 301, 302 to pass. In this example, transistor 303 passes a "1" signal.

Transistors 305 and 306 similarly act as a pair to allow either a ground signal (i.e., a "0") or the output of transistors 303, 304 to pass depending upon the carry-out signal $C0_{4-7}$ of the higher order bit adder 121 which added with a presumed carry-in of "0". In the example represented by the upper left corner of the map shown in FIG. 7A, the gate of transistor 305 is supplied with a "0". Therefore, transistor 305 does not allow the voltage signal to pass. To the contrary, the gate of transistor 306 is supplied with the complement of "0" (i.e., "1") and allows the output of transistors 303, 304 to pass. In this example, transistor 306 passes a "1" signal to inverter 307 and to the gate of p-type transistor 318.

Continuing with the example illustrated in the upper left corner of the map shown in FIG. 7A, the sources of transistors 311 and 312 similarly act as a pair and are supplied with signals of "0" at their sources. The gate of transistors 311 is supplied with a "0" and the gate of transistor 312 is supplied with the complement of "0" (i.e., "1"). Thus, transistor 312 passes the "0" signal to transistor 314.

Transistors 313 and 314 also act as a pair to allow either a ground signal (i.e., a "0") or the output of transistors 311, 312 to pass depending upon the carry-out signal $C1_{4-7}$ of the higher order bit adder 121 which added with a presumed carry-in of "1". In the example represented by the upper left corner of the map shown in FIG. 7A, the gate of transistor 314 is supplied with a "0". Therefore, transistor 314 does not allow the ground voltage signal to pass. To the contrary, the gate of transistor 313 is supplied with the complement of "0" (i.e., "1") and allows the output of transistors 311, 312 to pass. In this example, transistor 313 passes a "0" signal.

Transistors 315 and 316 similarly act as a pair to allow either a voltage signal Vdd (i.e., a "1") or the output of transistors 313, 314 to pass depending upon the carry-out signal $C0_{4-7}$ of the higher order bit adder 121 which added with a presumed carry-in of "0". In the example represented by the upper left corner of the map shown in FIG. 7A, the gate of transistor 315 is supplied with a "0". Therefore, transistor 315 does not allow the voltage signal Vdd to pass. To the contrary, the gate of transistor 316 is supplied with the complement of "0" (i.e., "1") and allows the output of transistors 313, 314 to pass. In this example, transistor 316 passes a "0" signal to inverter 317 and to the gate of p-type transistor 308.

In the foregoing example, p-type transistor 308 is supplied with a "0" from transistor 316. This causes transistor 308 to output a voltage signal Vdd (i.e., "1"). The p-type transistor 318 is supplied with a "1" from transistor 306. This prevents transistor 308 from passing the voltage signal Vdd. The cross-coupled "p" devices provide rail to rail voltage swings and help speed up the circuit.

Therefore, inverter 307 is supplied with "1" signals from p-type transistor 308 and transistor 306. Inverter 307 changes the "1" signal to "0" and outputs a true carry-out of "0". To the contrary, inverter 317 is supplied with a "0" signal from transistor 316 and changes the "0" signal to a "1" and outputs a complement of the true carry-out.

Therefore, the Karnaugh map of FIG. 7A, upper left corner, correctly indicates that the circuit will output a true carry-out of "0" given the inputs shown.

Similarly, the map shown in FIG. 7B would produce the same output of "0" given the same inputs in the upper left corner. There is no difference between the maps shown in FIG. 7A and 7B in this example, because the both maps indicate an actual carry-out of "1" given inputs of all "0".

A different result occurs between the map shown in FIG. 7A and FIG. 7B when the inputs are 01/01, respectively. Specifically, at such a location on the maps, carry-out $C0_{0-3}$ is "0", carry-out $C1_{0-3}$ is "1", carry-out $C0_{4-7}$ is "0" and carry-out $C1_{4-7}$ is "1". FIG. 7A illustrates a true carry-in of "0" given the foregoing inputs while FIG. 7B illustrates a true carry-in of "1" given the same inputs. The foregoing signals would be processed by the two-level selector circuit illustrated in FIG. 3 as follows.

With a true carry-in of "0", transistor 302 will allow a "1" signal to pass to transistor 304. Transistor 304 will allow a "1" signal to pass to transistor 306. Transistor 306 will allow the "1" signal to pass to the inverter 307 and p-type transistor 318. As explained above, a "1" output from 306 will cause inverter 307 to output a "0". The lower portion of the circuit illustrated in FIG. 3 would also similarly cause the complement of "0" (i.e., "1") to be output from inverter 317.

With a true carry-in of "1", transistor 301 will allow a "0" signal to pass to transistor 304. Transistor 304 will allow a voltage (i.e., "1") signal to pass to transistor 306. Transistor 306 will allow the "0" signal to pass to the inverter 307 and p-type transistor 318. As explained above, a "0" output from 306 will cause inverter 307 to output a "1". The lower portion of the circuit illustrated in FIG. 3 would also similarly cause the complement of "1" (i.e., "0") to be output from inverter 317.

Comparison of the remaining inputs to the circuit shown in FIG. 3 illustrates the function of the maps shown in FIGS. 7A and 7B; however, for sake of brevity, will not be discussed in detail.

The circuit illustrated in FIG. 3 produces substantial savings when compared to conventional carry selectors. Specifically, the two-level selector operates in one delay period while the conventional circuit requires two separate selectors, each of which requires a delay. Further, the two-level selector processes the true and complement of the function simultaneously, thereby saving delays associated with conventional inverters used to separately produce the complement.

Figure 4:
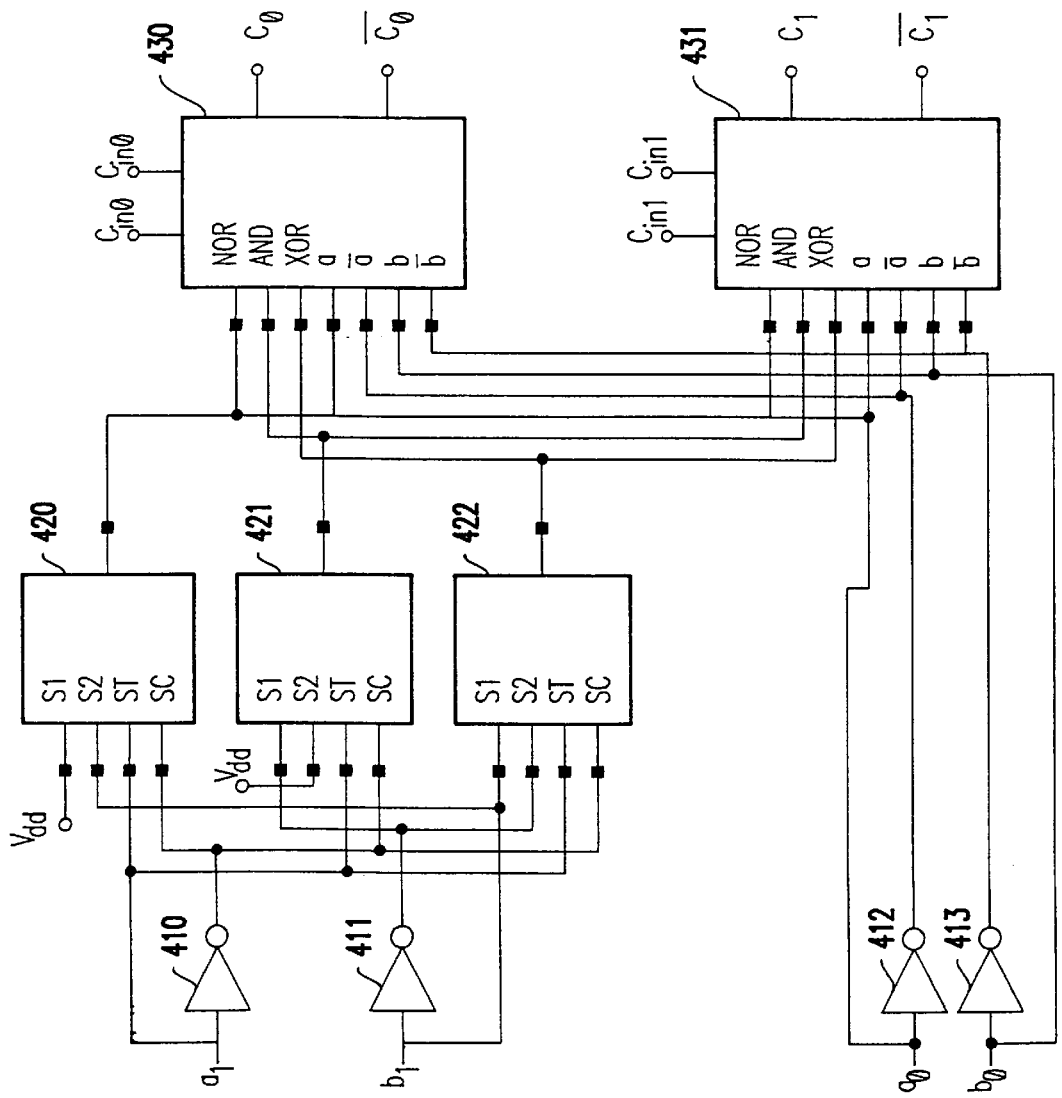
FIG. 4 is a schematic circuit diagram of a 2-bit adder of the present invention.
Figure 9:
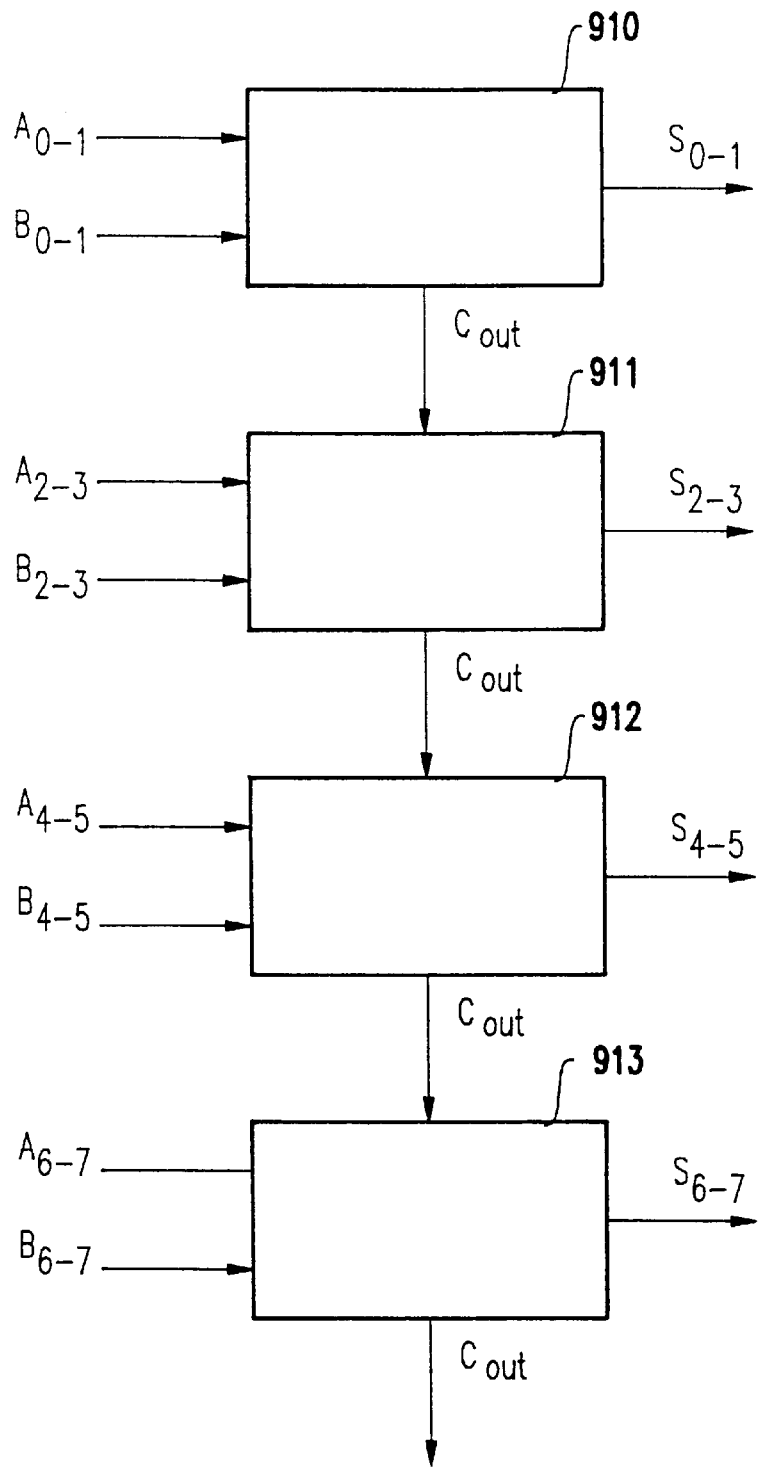
FIG. 9 is a schematic circuit diagram of a conventional series of two-bit adders.

FIG. 4 illustrates the detail operation of an adder according to the invention. A 2-bit adder is illustrated in FIG. 4. However, the adder illustrated in FIG. 4 is easily converted to a n-bit adder by one ordinarily skilled in the art. Specifically, the 2-bit adder illustrated in FIG. 4 serves as the basis for the 4-bit and 8-bit adders discussed above. For example, it is well known to connect a series of 2-bit adders, in parallel, to form 4-bit, 8-bit and larger adders. A conventional 8-bit adder comprising four 2-bit adders 910–913 is illustrated in FIG. 9. Each of the 2-bit adders 910–913 receives two bits from a first value $a_{0-1}$, $a_{2-3}$, $a_{4-5}$, and $a_{6-7}$ and two bits from a second value $b_{0-1}$, $b_{2-3}$, $b_{4-5}$ and $b_{6-7}$ and adds the values to produce sums $S_{0-1}$, $S_{2-3}$, $S_{4-5}$ and $S_{6-7}$. Further a carry-out $C_{out}$ runs in series from adder to adder.

Figure 5:
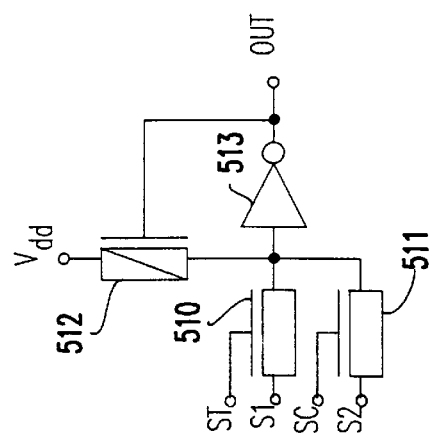
FIG. 5 is a schematic circuit diagram of a selector used in the adder of FIG. 4.
Figure 6:
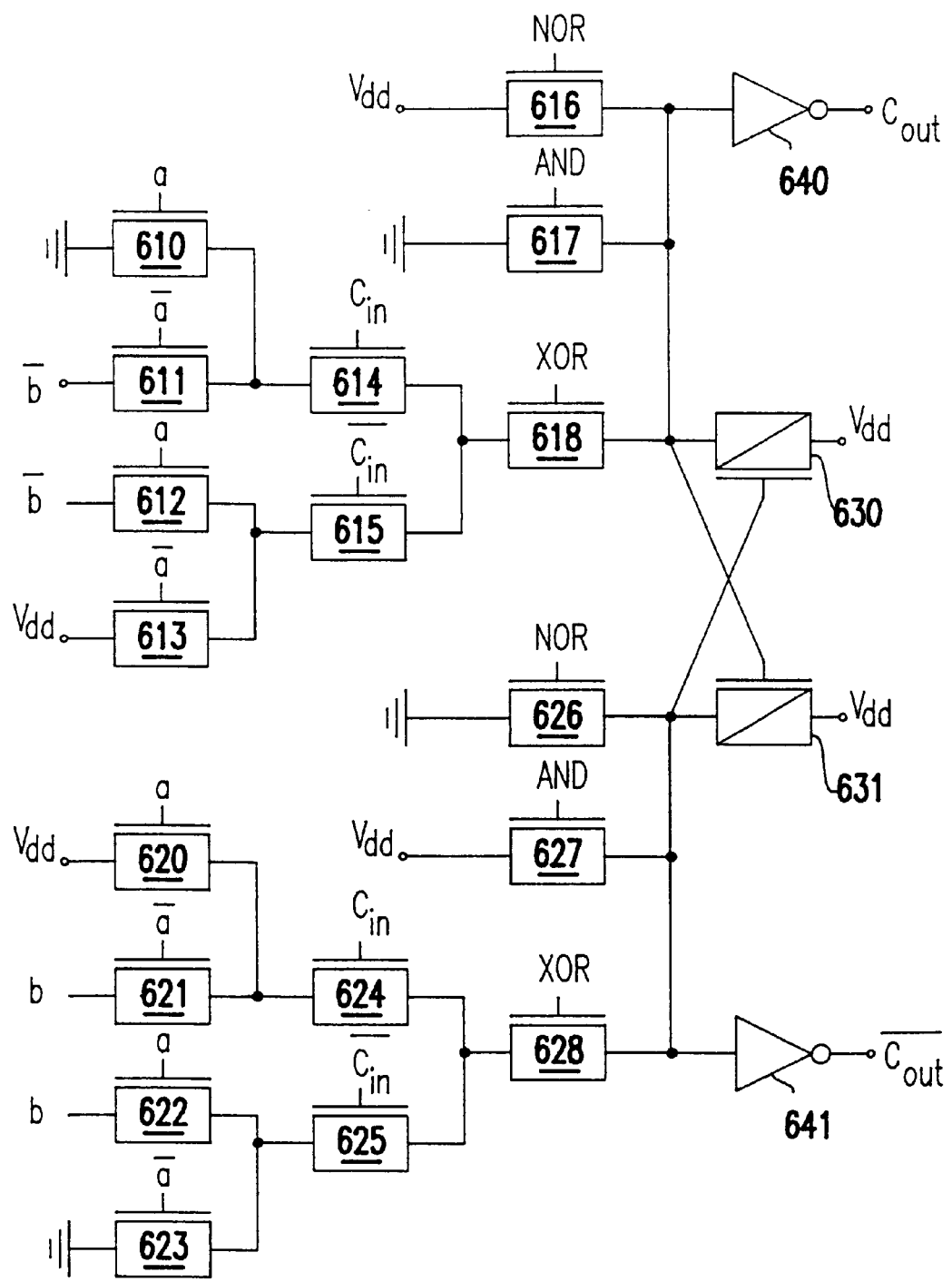
FIG. 6 is a schematic circuit diagram of a carry generator circuit used in the adder of FIG. 4.

FIG. 4 illustrates inverters 410–413, selectors 420–422 (which are shown in greater detail in FIG. 5) and carry generators 430, 431 (which are shown in greater detail in FIG. 6). For sake of simplicity, and to aid in the understanding of the invention, FIG. 4 only illustrates the carry generator function of an adder. Further, while the adders which add based on different carry-in values were shown as separate elements in FIG. 1 (i.e., adders 110 and 111) for simplicity, the more detail disclosure of the carry generators, shown in FIG. 4, illustrates that the adders are interconnected. For example, carry generator 430 could be used as the carry generation feature of adders 110, 120, 130 and 140 and carry generator 431 could be used as the carry generation feature of adders 111, 121, 131 and 141.

In FIG. 4, a first 2-bit value $a_0$–$a_1$ is added to a second 2-bit value $b_0$–$b_1$ in the example illustrated in FIG. 4. The bit $a_1$ is input to inverter 410 and to the selectors 420–422 as the ST signal. The ST signal stands for "Select True". The bit $b_1$ is input to the inverter 411 and to the selectors 420 and 422 as the S2 signal. The S2 signal stands for Source 2.

The inverted $a_1$ signal is output from inverter 410 to the selectors 420–422 as the SC signal. The SC signal stands for "Select Complement". The inverted $b_1$ signal is output from inverter 411 to selector 421 as the S1 signal and to selector 422 as the S2 signal. The S1 signal stands for signal 1.

As discussed in more detail below with respect to FIG. 5, selector 420 acts as a NOR circuit, selector 421 acts as an AND circuit and selector 422 acts as an XOR circuit. Therefore, outputs from the selectors 420–422 are input into the carry generators 430, 431 as the NOR, AND and XOR signals, respectively.

The bit $a_0$ is input to inverter 412 and to the carry generators 430, 431 as the "a" signal. The bit $b_0$ is input to inverter 413 and carry generators 430, 431 as the "b" signal. The outputs of the inverters 412 and 413 are the complements of the "a" and "b" signals and are input as the same to carry generators 430, 431.

Carry generator 430 also receives the presumed carry-in of "0" and its complement and outputs a carry-out C0 and its complement. Carry generator 431 receives the presumed carry-in of "1" and its complement and outputs a carry-out C1 and its complement.

FIG. 5 illustrates, in detail, each of the selectors 420, 421 and 422. As noted above, the selectors act as logical NOR, AND and XOR circuits. Specifically, the selectors include n-type pass transistors 510, 511, p-type pass transistor 512 and inverter 513. As mentioned above, for purposes of this application it will be assumed that n-type transistors allow signals to pass when the gate is supplied with a "1" (i.e., high voltage signal) and p-type transistors allow signals to pass when the gate is supplied with a "0" (i.e., low voltage signal).

Selector 420 acts as a logical NOR circuit and includes inputs ST (the $a_1$ bit signal) connected to the gate of transistor 510, S1 (voltage Vdd) connected to the source of transistor 510, SC (the inverted $a_1$ bit signal) connected to the gate of transistor 511 and S2 (the $b_1$ signal) connected to the source of transistor 511. Transistors 510 and 511 alternatively allow either the voltage Vdd or the $b_1$ bit signal to pass depending upon the $a_1$ bit signal. Inverter 513 inverts the signal output by transistors 510, 511.

The gate of p-type transistor 512 is connected to the output of inverter 513 and the source of transistor 512 is connected to the voltage Vdd. Therefore, transistor 512 acts as a keeper and helps to bring the internal node of the selector to full rail voltage.

In a logical NOR circuit, if one or more of the inputs are high, the output is low. With the above inputs being supplied to selector 420, it acts as a NOR circuit. Specifically, if $a_1$ is a high signal, it will cause transistor 510 to pass the voltage Vdd (i.e., a high signal) to inverter 513 which, in turn, will output a low signal. Similarly, if $b_1$ is a high signal and is passed through transistor 511, it will be inverted and output as a low signal by inverter 513. When both $a_1$ and $b_1$ are low signals, transistor 511 passes the $b_1$ low signal to the inverter 513, which then outputs a high signal.

Thus, when either the $a_1$ signal or $b_1$ signal is a high signal, the selector 420 will output a low signal and perform a logical NOR function.

In a similar manner, selector 421 performs a logical AND function. In a logical AND circuit, a high signal is output only when all the inputs are high signals.

When $a_1$ and $b_1$ are both high signals and are applied to selector 421, a high signal will be output. Specifically, $a_1$ (i.e., high signal) is applied to the gate of transistor 510 and allows the inverted $b_1$ signal (i.e., low signal) to pass to inverter 513, which outputs a high signal. Otherwise, if $b_1$ is a low signal, its complement (i.e., high signal) will be passed by transistor 510 and will be inverted to a low signal and output by inverter 513. Similarly if $a_1$ is a low signal, it will not allow transistor 510 to pass the $b_1$ signal and will only allow the voltage Vdd (i.e., high signal) to pass to inverter 513, which will output a low signal.

Thus, selector 421 acts as a logical AND circuit and outputs a high signal when both inputs are high signals. Otherwise selector 421 outputs a low signal.

Selector 422 performs a logical XOR operation. In a logical XOR circuit, a high signal is output when the two inputs are different.

For example if $a_1$ is a high signal and $b_1$ is a low signal, transistor 510 will pass the $b_1$ signal to inverter 513 which will output a high signal. Similarly, if $a_1$ is a low signal and $b_1$ is a high signal, transistor 511 will allow the inverted $b_1$ signal (i.e., low signal) to pass to inverter 513 which will output a high signal. To the contrary, if both the $a_1$ signal and the $b_1$ signal are high, transistor 510 will pass the high $b_1$ signal to the inverter 513, which will output a low signal and if both $a_1$ and $b_1$ are low, transistor 511 will pass an inverted $b_1$ signal (i.e. a high signal) to inverter 513, which will again output a low signal.

Therefore, selector 422 performs the logical XOR operation by outputting a high signal only when the input signals are different.

FIG. 6 illustrates the operation of the carry generators in greater detail. Each of the carry generators includes n-type transistors 610–618 and 620–628, p-type transistors 630, 631 and inverters 640, 641. The signal representing one bit of one of the numbers being added is represented by a and the signal representing one bit of the other number being added is represented by b.

The "a" signal is supplied to the gates of transistors 610, 612, 620 and 622 and the complement of the "a" signal is supplied to the gates of transistors 611, 613, 621 and 623. The actual carry-in signal $C_{in}$ is supplied to the gates of transistors 614 and 624 and the complement of the carry-in signal is supplied to the gates of transistors 615 and 625.

The output of selector 420 is supplied to the gates of transistors 616 and 626 as a NOR signal. The output of selector 421 is supplied to the gates of transistors 617 and 627 as an AND signal. The output of selector 422 is supplied to the gates of transistors 618 and 628 as an XOR signal.

The sources of transistors 610, 623, 617 and 626 are connected to ground (i.e., low signal) and the sources of transistors 613, 620, 616 and 627 are connected to a voltage Vdd (i.e., high signal). The sources of transistors 611 and 612 are supplied with the complement of the "b" signal and the sources of transistors 621 and 622 are supplied with the "b" signal.

In operation, transistor 616 will have a high NOR signal supplied to its gate only when both the "a" and "b" signals input into selector 420 are low signals, as discussed above. In such a situation, the voltage Vdd will be supplied to the inverter 640 and a low signal will be output. Therefore, when a "0" is added to a "0", the carry-out for a given bit will be "0". Transistor 626 performs a similar, but complementary operation.

As discussed above, transistor 617 will receive a high AND signal supplied to its gate only when both the "a" and "b" signals input to selector 421 are high signals. In such a situation, transistor 617 will pass the ground (i.e., low) signal to inverter 640, which will, in turn, output a high signal. Therefore, when a "1" is added to a "1", the carry-out for a given bit will be "1".

When the inputs are different, selector 422 outputs a high XOR signal which is supplied to the gate of transistors 618 and 628 and, in such a situation, these transistors allow the signal flowing from remaining elements of each circuit to pass.

When the "a" signal is high, transistor 610 allows a ground (i.e., low) signal to pass to the source of transistor 614 and transistor 612 allows the complement of the "b" signal to pass to the source of transistor 615. If the "b" signal is different than the "a" signal, the "b" signal will be low and the complement of the "b" signal will be high.

When the "a" signal is low, transistor 611 allows the complement of the "b" signal (i.e., low) to pass to transistor 614 and transistor 613 allows the voltage Vdd (i.e., high) to pass to transistor 615.

Therefore, in either of the above situations where signals a and b are different, transistor 614 is supplied with a low signal and transistor 615 is supplied with a high signal. Transistor 614 will allow the low signal to pass when the carry-in signal is high (i.e., "1"), and transistor 615 will allow the high signal to pass when the carry-in signal is low (and the complement of the carry-in signal is high). As discussed above, transistor 618 allows the signal from transistor 614 or transistor 615 to pass when signals a and b are different. Inverter 640 will invert the signal output by transistor 618.

Thus, when the carry-in is a high signal (i.e., "1") transistor 614 will allow the low signal to pass and inverter 618 will invert the low signal and output a high signal (i.e., "1") as the carry-out signal. To the contrary, when the carry-in is a low signal (i.e., "0"), transistor 615 will allow the high signal to pass to inverter 618 which will invert the signal to a low signal (i.e., "0") as a carry-out. As can be seen from the foregoing, if one bit to be added is a "1" and the other bit is a "0", their addition will result in a carry-out of "1" when the carry-in signal is "1" and a carry-out of "0" when the carry-in signal is "0".

The elements in the lower portion of the circuit illustrated in FIG. 6 operate in a complementary fashion to the corresponding elements discussed above, such that the complement of the carry-out signal is output from inverter 641 and will not be discussed in detail for sake of brevity. Further, the cross-coupled p-type transistors 630, 631 operate in the same manner as transistors 308 and 318, discussed above with respect to FIG. 3, to provide rail to rail voltage swings and to help speed up the transistors.

Therefore, the adder of the invention includes a carry generator which simultaneously produces a carry-out and its complement. To the contrary, conventional carry generators must include at least one additional delay to invert the carry-out in order to generate the complement of the carry-out. Thus, since the inventive carry generator is able to produce both the carry-out and its complement simultaneously, it is able to operate faster than conventional carry generators.

While the foregoing embodiment has been described for a 32-bit adder, the same could be applied to any other n-bit adder.

The present invention has less delay elements than conventional carry select adders. Specifically, each conventional 4-bit adder requires five logic delays and each selector requires one logic delay. Therefore, the conventional carry select adder, such as that shown in FIG. 8, would require nine logic delays. Specifically, adders 810 and 811 would require four delays. Adders 820, 821, 803, 831, 840 and 841 would operate simultaneously and not increase this delay period. Each of the selectors, 813, 823, 833 and 843 requires a sequential one delay period for a total of four logic delays.

Figure 8:
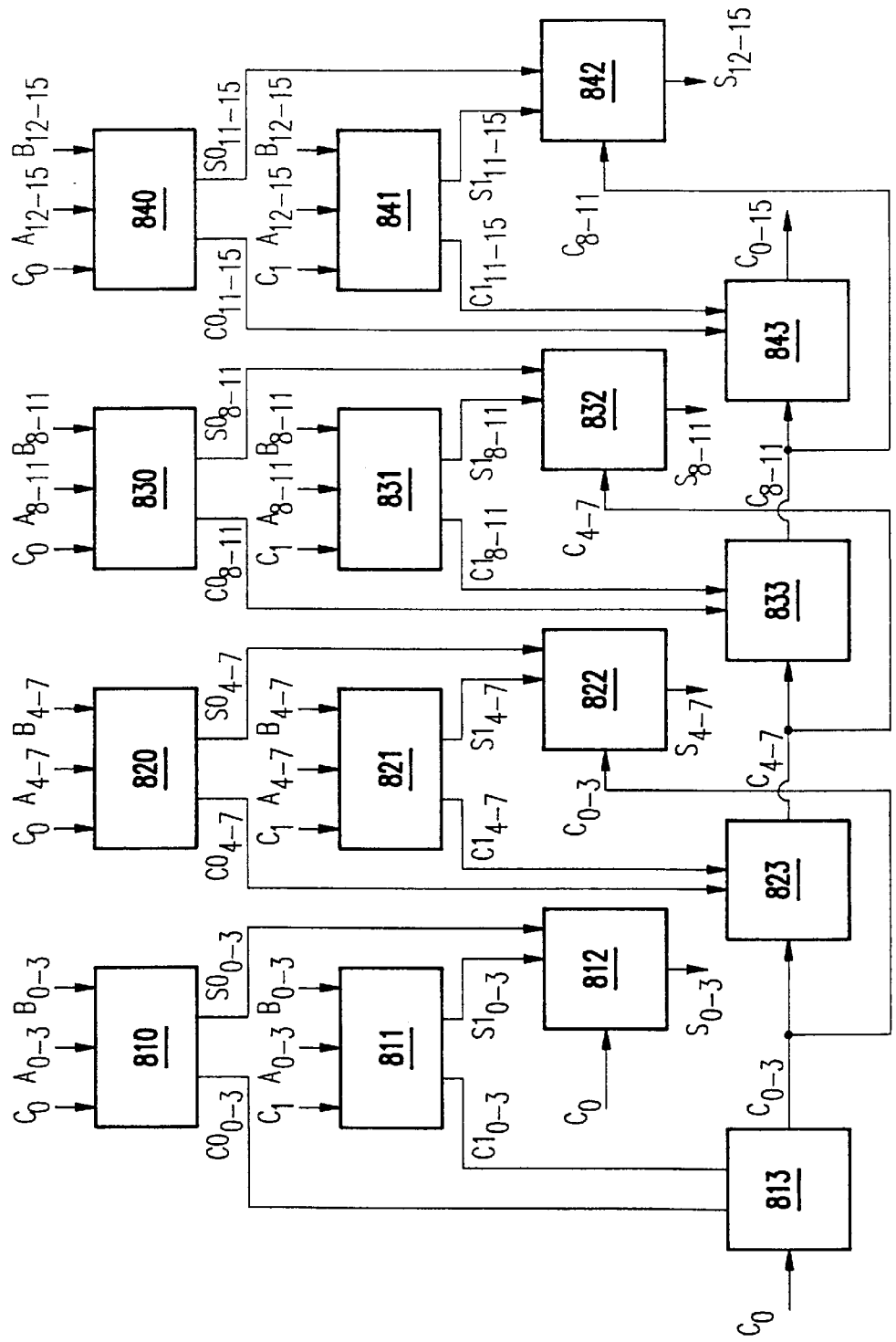
FIG. 8 is a schematic circuit diagram of a conventional carry select adder.

Therefore, the conventional 16-bit carry select adder illustrated in FIG. 8 requires five logic delays for the adders and four logic delays for the selectors for a total of nine delays. For a full explanation of the delays involved, see the discussion of the Bechade patent, referenced above.

To the contrary, the inventive 16-bit carry select adder, shown in FIG. 1, requires only six logic delays. Specifically, four logic delays are required for the adders. As explained above, the adder illustrated in FIG. 4 has fewer delays than the conventional adder, such as that described in the Bechade patent, because a logic delay is saved by simultaneously generating the true and complement of the function.

Further, only one sequential delay is required for each of the two-level selectors 150 and 151 for a total of two additional delay periods. Therefore, the four delays associated with the adders and the two delays associated with the selectors results in a total of six delays.

While the number of delays is reduced with the present invention, the actual length of each "delay" varies between the inventive and conventional selectors because of the different circuit designs. However, the reduction of the number of delays more than compensates for any increase in the actual length of any individual delay. Therefore, the time savings are not in direct proportion to the reduction of number of delay stages. In actual testing the inventive carry select adder was found to be 34% faster than conventional 32-bit carry select adders, 29% faster than 32-bit carry look ahead adders and to have an 11% lower device count than conventional carry look ahead adders.

The inventive adder also operates faster than conventional adders because the true and complement are processed in one circuit simultaneously. For example, as illustrated in FIG. 3, the two level selector simultaneously selects between two potential carry-outs of two orders of bits of data using the true and complement. Therefore, the additional delays that are associated with inverters used to account for the complement of the function, which are common in conventional circuits, are avoided in the inventive circuit.

While the embodiments above have been illustrated with the specific structure of the appended figures, as would be known by the ordinary skilled artisan within the purview of this application, this invention is applicable to any adders or units which perform similar functions.

Thus, while the invention has been described in terms of the above embodiments, those skilled in the art will recognize that the invention can be practiced with modification within the spirit and scope of the appended claims.

Having thus described our invention, what we claim as new and desire to secure by letters patent is as follows:

1. A carry select adder comprising:
   at least two adders for simultaneously producing at least two pairs of candidate carry-out signals, wherein a first candidate carry-out signal of each of said pairs of carry-out signals is based on a first presumed carry-in signal and a second candidate carry-out signal of each of said pairs of carry-out signals is based on a second presumed carry-in signal, different than said first presumed carry-in signal;
   a two-level selector receiving said at least two pairs of candidate carry-out signals, said two-level selector selecting from said pairs of carry-out signals an actual carry-out signal based on an actual carry-in signal; and
   a single level selector receiving said first candidate carry-out signal and said second candidate carry-out signal from a first set of adders of said at least two adders and selecting from said first candidate carry-out signal and said second candidate carry-out signal an actual carry-out signal based on an actual carry-in signal.

2. A carry select adder as in claim 1, wherein said at least two adders comprises said first set of adders and a second set of adders,
   said first set of adders includes
      a first adder adding a first order of bits with said presumed carry-in of "0" and providing therefrom a first candidate carry-out signal of a first of said at least two pairs, and
      a second adder adding said first order of bits with said presumed carry-in of "1" and providing therefrom a second candidate carry-out signal of said first of said at least two pairs, and
   said second set of adders includes
      a third adder adding a second order of bits wit said presumed carry-in of "0" and providing therefrom a first candidate carry-out signal of a second of said at least two pairs, and
      a fourth adder adding said second order of bits with said presumed carry-in of "1" and providing therefrom a second candidate carry-out signal of said second of said at least two pairs.

3. A carry select adder as in claim 2, wherein said two-level selector comprises:
   first selecting means for selecting between one candidate carry-out signal from each of said first adder and said second adder responsive to said actual carry-in signal;
   second selecting means, connected to a voltage source and said first selecting means, for selecting between said voltage source and an output of said first selecting means;
   third selecting means, connected to a ground and said second selecting means, for selecting between said ground and an output of said second selecting means; and
   an inverter, connected to said third selecting means, for inverting an output from said third selecting means and outputting said actual carry-out signal.

4. A carry select adder as in claim 2, wherein said first adder, said second adder, said third adder and said fourth adder each comprise a 4-bit adder.

5. A carry select adder as in claim 1, wherein each of said at least two adders includes a carry generator which simultaneously outputs a true carry-out and a complement carry-out.

6. A carry select adder as in claim 5, wherein said twolevel selector simultaneously selects a carry-out for 8-bits.

7. A carry select adder as in claim 1 further comprising:
   a carry out selector circuit receiving said pair of candidate carry-out signals from a first of said at least two adders and selecting a first actual carry out therefrom responsive to said actual carry-in signal,
   said first actual carry out being a carry in for a second of said at least two adders.

8. A carry select adder comprising:
   means for simultaneously producing at least two pairs of candidate carry-out signals, wherein a first candidate carry-out signal of each of said pairs of carry-out signals is based on a first presumed carry-in signal and a second candidate carry-out signal of each of said pairs of carry-out signals is based on a second presumed carry-in signal, different than said first presumed carry-in signal;
   first means, receiving said at least two pairs of candidate carry-out signals and an actual carry-in signal and selecting one of said candidate carry-out signals as an actual carry-out signal responsive to said actual carry-in signal; and
   second means for receiving said first candidate carry-out signal and said second candidate carry-out signal from a first set of producing means of said producing means and selecting from said first candidate carry-out signal and said second candidate carry-out signal an actual carry-out signal based on an actual carry-in signal.

9. A carry select adder as in claim 8, wherein said selecting means comprises a two-level selector.

10. A carry select adder as in claim 8, wherein said producing means comprises said first set of producing means and second set of producing means, said first set of producing means includes
a first adder adding a first order of bits with said presumed carry-in of "0" and providing therefrom a first candidate carry-out signal of a first of said at least two pairs, and
a second adder adding said first order of bits with said presumed carry-in of "1" and providing therefrom a second candidate carry-out signal of said first of said at least two flairs, and said second set of producing means includes
a third adder adding a second order of bits with said presumed carry-in of "0" and providing therefrom a first candidate carry-out signal of a second of said at least two pairs, and
a fourth adder adding said second order of bits with said presumed carry-in of "1" and providing therefrom a second candidate carry-out signal of said second of said at least two pairs.

11. A carry select adder as in claim 10, wherein said selecting means comprises
first selecting means for selecting between one candidate carry-out signal from each of said first adder and said second adder responsive to said actual carry-in signal;
second selecting means, connected to a voltage source and said first selecting means, for selecting between said voltage source and an output of said first selecting means;
third selecting means, connected to a ground and said second selecting means, for selecting between said ground and an output of said second selecting means; and
an inverter, connected to said third selecting means, for inverting an output from said third selecting means and outputting said actual carry-out signal.

12. A carry select adder as in claim 10, wherein said first adder, said second adder, said third adder and said fourth adder each comprise a 4-bit adder.

13. A carry select adder as in claim 12, wherein said two-level selector simultaneously selects a carry-out for 8-bits.

14. A carry select adder as in claim 8, wherein said producing means includes means for simultaneously generating a true carry-out and a complement carry-out.

15. A carry select adder as in claim 8 further comprising:
a carry out selector circuit receiving said pair of candidate carry-out signals from a first of said at least two adders and selecting a first actual carry out therefrom responsive to said actual carry-in signal,
said first actual carry out being a carry in for a second of said at least two adders.

* * * * *